United States Patent
Jeon

(10) Patent No.: US 7,862,129 B2
(45) Date of Patent: Jan. 4, 2011

(54) ELECTRIC PARKING BRAKE SYSTEM WITH ONE CABLE FOR VEHICLE

(75) Inventor: Jae Woo Jeon, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 1016 days.

(21) Appl. No.: 11/626,575

(22) Filed: Jan. 24, 2007

(65) Prior Publication Data

US 2008/0135355 A1 Jun. 12, 2008

(30) Foreign Application Priority Data

Dec. 7, 2006 (KR) ................. 10-2006-0123456

(51) Int. Cl.
*F16D 65/34* (2006.01)
*B60T 13/74* (2006.01)

(52) U.S. Cl. .................... 303/2; 303/20; 188/2 D; 188/162; 188/156; 188/265

(58) Field of Classification Search ............. 188/204 R, 188/156–157, 265, 2 D, 162, 106 P; 303/2, 303/20

See application file for complete search history.

(56) References Cited

U.S. PATENT DOCUMENTS

| | | | | |
|---|---|---|---|---|
| 5,180,038 | A * | 1/1993 | Arnold et al. | 188/171 |
| 5,345,839 | A * | 9/1994 | Nett et al. | 74/606 R |
| 6,755,284 | B2 * | 6/2004 | Revelis et al. | 188/2 D |
| 2005/0115774 | A1 * | 6/2005 | Nieto Gil et al. | 188/2 D |
| 2005/0250382 | A1 * | 11/2005 | Mourad et al. | 439/578 |
| 2006/0016642 | A1 * | 1/2006 | Deutloff et al. | 188/2 D |
| 2007/0169578 | A1 * | 7/2007 | Christensen et al. | 74/89.37 |

FOREIGN PATENT DOCUMENTS

JP 2006-50885 2/2006
WO WO 9856633 A1 * 12/1998

OTHER PUBLICATIONS

English language Abstract of JP2006-50885.
English language Abstract of JP 2006-50885.

* cited by examiner

*Primary Examiner*—Robert A Siconolfi
*Assistant Examiner*—Anna Momper
(74) *Attorney, Agent, or Firm*—Greenblum & Bernstein P.L.C.

(57) ABSTRACT

The present invention provides an electric parking brake system with one cable that has only one cable between an actuator, serving as a power generator, and parking cables and high flexibility in laying-out for mounting to a vehicle. According to an electric parking brake system with one cable of the invention, an actuator that converts torque of a motor into axial moving force to operate parking cables is manufactured into a single module, a housing that defines the whole external shape of the actuator is formed into an integral unit by injection molding, in which vibration caused by rotation in the operation of the actuator is absorbed by elastic members, so that a small-sized actuator having improved workability in mounting can be obtained and desired performance, such as reduction of operational noise caused by absorption of vibration, can be achieved.

15 Claims, 3 Drawing Sheets

ELECTRIC PARKING BRAKE SYSTEM WITH ONE CABLE FOR VEHICLE

CROSS-REFERENCE TO RELATED APPLICATIONS

The present application is based on, and claims priority from, Korean Application Serial Number 10-2006-0123456, filed on Dec. 7, 2006, the disclosure of which is hereby incorporated by reference herein in its entirety.

FIELD OF THE INVENTION

The present invention relates to an electric parking brake system for a vehicle, particularly an electric parking brake system with one cable for a vehicle.

BACKGROUND OF THE INVENTION

In general, when it is intended to park a vehicle with a driver getting off, movement of the vehicle is restricted by actuating a parking brake system.

As for such a parking brake, in general, an equalizer equally distributes force applied to parking cables pulled by a parking brake lever to brakes mounted to wheels and the brakes restrict the wheels and prevent motion of a vehicle accordingly.

When a driver brakes wheel by operating a parking brake lever as described above, the driver had to manually operate a parking brake lever every time for parking-braking, so that it was inconvenient for drivers. Further, sometimes drivers forgot it and it is followed by danger of an accident.

For this reason, electric parking brake systems that are actuated by a motor for parking-braking and keep the braking safely to get rid of inconvenience in manual parking brakes have been used. In such an electric parking brake system, in general, when a driver pushes an operating switch to actuate a motor, as the motor rotates and pulls parking cables, equal braking force is applied to each wheel through an equalizer.

Further, such an electric parking brake system necessarily requires to measure tension acting in parking cables pulled by a motor, so that, in general, force due to compression and expansion of a spring is measured and locking of the parking cables is maintained and required driving force of the motor is controlled more accurately through the measured force.

According to such an electric parking brake system, in general, a motor that generates power, a gear box that converts the power into motion, and a screw rod that pulls parking cables are formed into an integral module, which is mounted to the trunk or the rear frame and a driver actuates it by operating an operating switch after getting off a vehicle.

Further, it is a tendency to improve such electric parking brake systems into as small size as: possible to provide convenience more in mounting and in order not to cause structural modifications for portions to mount due to the characteristics for mounting them to a real vehicle, because a module for generating power and converting motional direction is individually manufactured and then mounted a vehicle.

It is an object of the invention to provide a small-sized module for an electric parking brake system by efficiently integrating components for generating power, converting motional direction, and operating parking cables into a module, and improve productivity of the module by forming a housing box that forms the whole external shape of the module into an integral unit through injection molding.

It is another object of the invention to balance load of components mounted in a module housing box formed into an integral unit by injection molding and efficiently distribute and absorb vibration in the operation.

It is another object of the invention to provide an actuator that does not require a particular structural design for increasing durability of a housing box by stopping linear motional force from interrupting rotational motion when rotational power is converted into a for linear motion for pulling parking cables in a module.

It is another object of the invention to increase flexibility in laying-out in mounting a module as compared with modules using two cables by connecting parking cables through one cable to a linear motional member in a module.

SUMMARY OF THE INVENTION

Embodiments of the present invention provide an electric parking brake system with one cable for a vehicle including an actuator, a connecting cable, left and right parking cables, and stationary brakes. The actuator includes an integral hosing box, a power generating unit, a motion converting unit, an operating force generating unit, a load sensor, a vibration absorbing member, and provides locking and releasing forces to parking brakes. The integral hosing box is formed by injection molding and has a plurality of sections inside. The power generating unit is a motor mounted in the housing box and rotating normally and reversely through power supplied depending on operational positions of an operating button. The motion converting unit is a gear train of a pair of engaged gears rotated by the motor. The operating force generating unit is a screw nut fastened to a screw rod rotated by the gear train and generating axial moving force for operating parking cables. The load sensor measures axial load generated by the screw rod and transmits the measured load to ECU. The vibration absorbing member is mounted in the integral hosing box to absorb vibration generated by the motor and the gear train rotating, the actuator.

The connecting cable is fastened to the actuator and pulled by axial linear moving force generated from the actuator. The left and right parking cables are drawn from both sides of a distributing member equally distributing the pulling force of the connecting cable into two directions, and connected to both wheels. The stationary brakes hold disc wheels by the pulling force of the left and right parking cables and restrict movement of a vehicle.

The motion converting unit includes a gear train of a pair of gears and a gear box. The gear train is composed of a driving gear that is fixed to a motor shaft and rotated by the motor and a driven gear that is engaged with the driving gear, and rotates and generates axial moving force. The gear box receives the gear train and mounted in the integral housing box.

The screw rod is fitted in a joining hole formed through the center of the driven gear of the gear train that is engaged with the driving gear rotated by the motor.

Further, the screw rod has fitting grooves longitudinally formed to insert restricting protrusions protruding inside the joining hole formed through the center of the driven gear.

An extending shaft having a diameter smaller than that of the screw rod is coaxially formed at an end of the screw rod so that the load sensor is provided in the screw rod.

A supporting shaft having a diameter smaller than that of the extending shaft of the screw rod is coaxially formed at the extending shaft and supported by a supporting member in the integral housing box.

The integral housing box is divided into a main space region and a side extending space region. The main space region receives the motor, the gear train rotated by the motor, and the screw rod generating axial moving force. The side extending space region protrudes from both sides of the main space region in a width smaller than the whole width of the main space region. Further, the side extending space region receives a part of the screw rod generating axial moving force and the load sensor measuring axial force of screw rod.

The main space region is divided into a power generating unit-receiving section, an operating force generating unit-receiving section, and a motion converting unit-receiving section. The power generating unit-receiving section includes a connector chamber, a power transmission unit chamber, and a partition. The connector chamber receives the connector for a signal line and a power line for operation is disposed. The power generating unit chamber is adjacent to connector chamber and has seating-support members of ribs being in close contact with the motor to fix the motor. The partition vertically stands to divide the connector chamber from the power generating unit chamber integrally connected with connector chamber.

The operating force generating unit-receiving section that is defined parallel with and over the power generating unit-receiving section and receives the screw rod generating axial force for operating the parking cables at a seating-support member. The motion converting unit-receiving section is vertically defined at sides of the power generating unit-receiving section and the operating force generating unit-receiving section. The motion converting unit-receiving section also receives the gear box with the gear train generating axial moving force for the screw rod from driving force of the motor. The gear box is provided on a seating-support member.

The side extending space region includes a front extended section, a load sensor-receiving section, and a rear extended section. The front extended section protrudes from a side of the main space region in a smaller width than the main space region to receive the screw nut. The screw nut has one end threaded-fastened to the screw rod and the other end connected to the connecting cable under axial moving force pulling the parking cables.

The load sensor-receiving section protrudes in the same width as the front extended section from the opposite side to the front extended section of the motion converting unit-receiving section to receive the load sensor measuring axial force of the screw rod.

The rear extended section protrudes from the load sensor-receiving section and is defined by an insertion slot to insert a fixing plate of steel. A supporting member that supports an end of the screw rod is received in the load sensor-receiving section.

A first isolator, which is provided to the partition vertically standing to section the power generating unit-receiving section off and comes into close contact with the motor, absorbs vibration of the motor.

A second isolator of rubber, which is provided to the lower side opposite to the motor of the gear box in the motion converting unit-receiving section and comes into close contact with the gear box, absorbs vibration caused by rotation of the motor and the driving gear.

Third and fourth isolators of rubber, which are provided to both upper sides of the gear box in the motion converting unit-receiving section and come into close contact with the gear box, absorb vibration caused by rotation of the driven gear and the screw rod.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, a detailed description will be given of the present invention.

Figure 1:
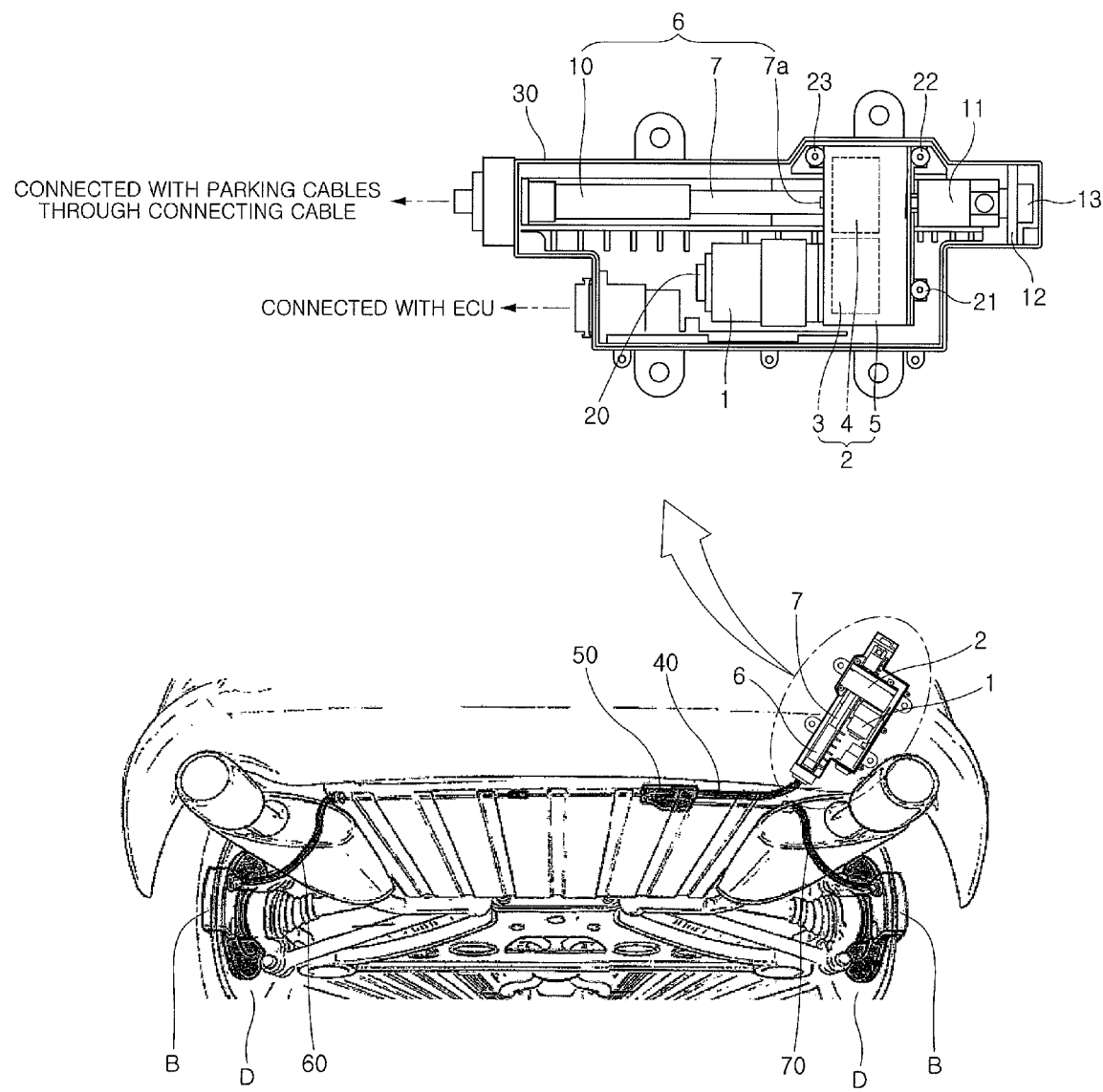
FIG. 1 is a view showing the configuration of an electric parking brake system with one cable for a vehicle according to an embodiment of the invention.

FIG. 1 is a view showing the configuration of an electric parking brake system with one cable for a vehicle according to an embodiment of the invention. Referring to FIG. 1, the electric parking brake system includes an actuator that is mounted to the trunk of a vehicle and provides locking or releasing force to a parking brake through power supplied depending on operational positions of an operating button, a connecting cable 40 that is drawn from the actuator and pulled by linear moving force generated from the actuator, left and right parking cables 60, 70 that are drawn from both sides of a distributing member 50, which equally distributes the pulling force transmitted through connecting cable 40 into two directions, and connected to both wheels, and stationary brakes B that restrict vehicle's movement by holding disc wheels D through the pulling force transmitted through left and right parking cables 60, 70.

The actuator includes an integral hosing box 30 that is formed by injection molding and has a plurality of sections inside, a power generating unit 1 that is mounted in housing box 30 and rotates normally and reversely through power supplied depending on operational positions of the operating button, a motion converting unit 2 that is composed of a gear train of a pair of engaged gears that are rotated by power generating unit 1, and an operating force generating unit 6 that converts torque generated through motion converting unit 2 into force for axial linear motion.

Integral housing box 30 has a load sensor 11 that measures axial load generated in the operation of housing box 30 and then transmits the measured result to an ECU. Load sensor 11 is mounted to an end of a shaft of operating force generating unit 6 disposed through motion converting unit 2.

Integral housing box 30 has a vibration absorbing member that absorbs vibration due to the operation of power generating unit 1 and motion converting unit 2. The vibration absorbing member is made of elastic rubber and positioned around power generating unit 1 and motion converting unit 2. Power generating unit 1 is a motor generally used for electric parking brake systems, and horizontally disposed inside integral housing box 30.

Further, motion converting unit 2 is a gear train of a pair of engaged gears that is connected to a motor shaft to boost driving force of the motor. For example, motion converting unit 2 includes a gear box 5 vertically disposed inside integral housing box 30, a driving gear 3 fixed to a motor shaft in gear box 5 and rotated by the motor, and a driven gear 4 engaged with and rotated by driving gear 3, and generating axial moving force.

Reducing and boosting ratios of driving and driven gears 3, 4 are determined on the basis of the magnitude of pulling force for parking cables 60, 70 actuating brakes B that restricts vehicle's movement in parking, and depend on the types of vehicles.

Driving gear 3 and driven gear 4 are helical gears or spur gears.

Operating force generating unit 6 is composed of a screw rod 7 that is horizontally disposed parallel with the motor inside integral housing box 30 and rotated by the gear train rotated by the motor, and a screw nut 10 having one end is threaded-fastened to screw rod 7 to axially reciprocate by torque out of screw rod 7 and the other end with the connecting cable 40 fixed to pull parking cables 60, 70.

Figure 2:
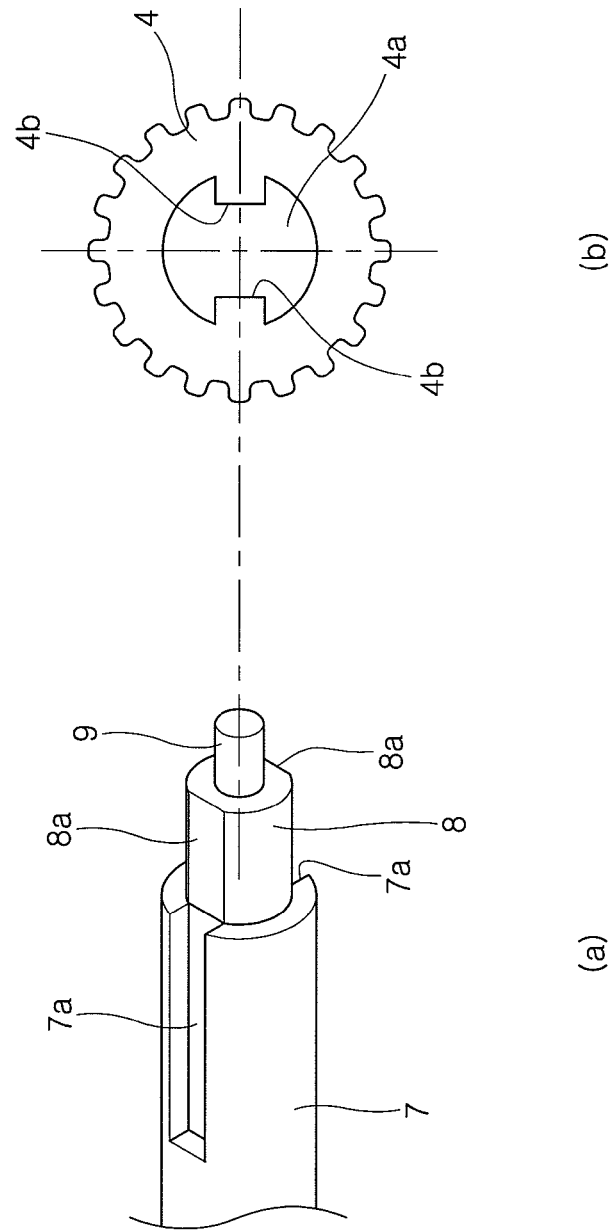
FIGS. 2A and 2B are views illustrating transmission of torque through a gear train according to an embodiment of the invention.

Screw rod 7, as shown in FIGS. 2A and 2B, has fitting grooves 7a where restricting protrusions 4b protruding inside a joining hole 4a formed through the center of driven gear 4 are inserted so that screw nut 10 rotate in the opposite direction to the threaded-fastening by driven gear 4 engaged with driving gear 3 rotated by the motor, an extending shaft 8 that coaxially extends from screw rod 7 and has a smaller diameter than screw rod 7 and an extending fitting portions 8a connected with fitting grooves 7a, and a supporting shaft 9 that coaxially extends from extending shaft 8 and has a smaller diameter than extending shaft 8.

Screw rod 7 and driven gear 4 are joined through restricting protrusions 4b and fitting grooves 7a in the present embodiment, but may be joined through serration joining in which serrations are formed around the inside of driven gear 4 and the outer circumference of screw rod 7.

Screw nut 10 is pulled or pushed according to the rotational directions of screw rod 7 with a thread formed around the outer circumference, by a thread formed around the inside. The axial motion of screw nut 10 generates force pulling or releasing connecting cable 40 that transmits operating force for parking cables 60, 70.

Load sensor 11 is provided to measure the magnitude of the axial force and ensure the accuracy in controlling the motor by ECU, when the driving force of the motor is converted into the axial moving force for operating the parking cables. Load sensor 11 is mounted on an end of screw rod 7 positioned through driven gear 4 engaged with driving gear rotated by the motor.

Load sensor 11, that is, is mounted to extending shaft 8 of screw rod 7 that is positioned through driven gear 4 and exposed outside gear box 5, and measures and transmits axial loads due to torque out of screw rod 7 to ECU.

Load sensor 11 measures load through a general way, such as in Hall IC that senses changes in current through a spring deformed with respect to rotation of screw rod 7 or in the magnitude of magnetic force with respect to the rotation.

Forming the free end of extending shaft 8 of screw rod 7, supporting shaft 9 is supported by a supporting member 13 in integral housing box 30 and supporting member 13 is supported by a fixing plate 12 inserted in an insertion slot 37 formed inside integral housing box 30.

Fixing plate 12 is formed of steel and generally and uniformly distributes the load of integral housing box 30 with all the components assembled.

Integral housing box 30 is integrally formed by injection molding and has a plurality of sections inside. For example, integral housing box 30 is sectioned into a main space region that receives the motor, the gear train rotated by the motor, and the screw rod generating axial moving force and a side extended space region that protrudes from both sides of the main region, with a smaller width than the whole width of the main region, and receives a part of the screw rod generating axial moving force and load sensor 11 measuring axial force of screw rod 7.

Figure 3:
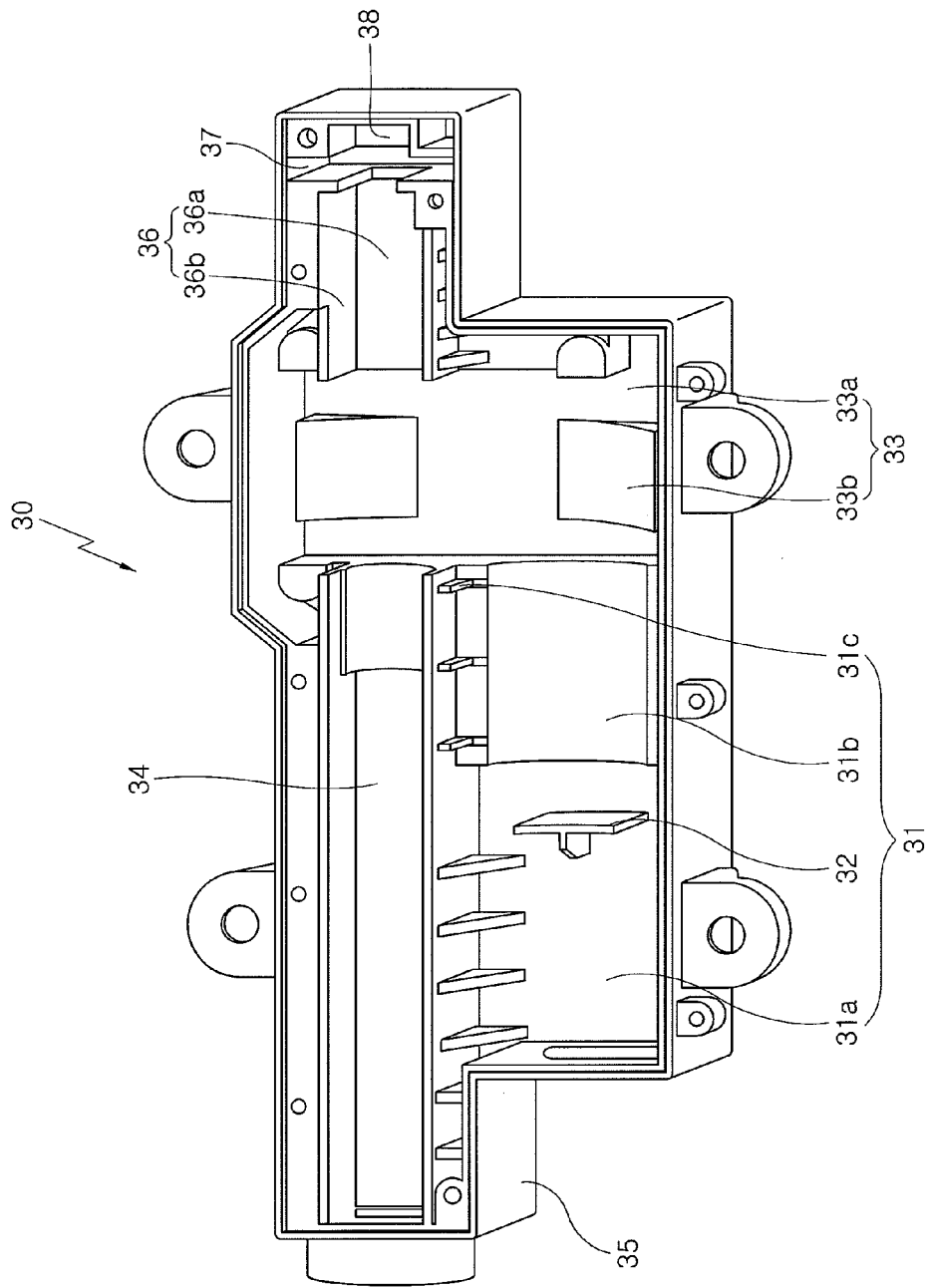
FIG. 3 is view showing the configuration of an integral housing box according to an embodiment of the invention.

As shown in FIG. 3, integral housing box 30 includes a power generating unit-receiving section 31 that receives a motor and a connector supplying signals and electric power, an operating force generating unit-receiving section 34 that is defined parallel with and over power generating unit-receiving section 31 in parallel and receives the screw rod generating axial force for operating the parking cables, and a motion converting unit-receiving section 33 that is vertically defined at sides of power generating unit-receiving section 31 and operating force generating unit-receiving section 34 and receives gear box 5 with the gear train generating axial moving force for the screw rod from driving force of the motor.

Further, integral housing box 30 further includes a front extended section 35 that protrudes from operating force generating unit-receiving section 34 to connect connecting cable 40 under axial moving force of the screw load and a load sensor-receiving section 36 that protrudes with the same width as front extended section 35 from a side of motion converting unit-receiving section 33 to receive load sensor 11 measuring axial force of screw rod 7.

Load sensor-receiving section 36 has an insertion slot 37 to insert fixing plate 12 of steel and a rear extended section 38 further extends from insertion slot 37 and receiving supporting member 13 that supports an end of screw rod 7.

Power generating unit-receiving section 31 is composed of a connector chamber 3a that receives the connector for a power line, etc., for operation, a power transmission unit chamber 31b that is adjacent to connector chamber 31a and has seating-support members 31c of ribs R1b closely contacting with the motor to fix the motor, and a partition 32 that vertically stands to divide connector chamber 31a from power generating unit chamber 31b integrally connected with connector chamber 31a.

Partition 32 supports the rear of the motor and has a vibration absorbing member to absorb vibration generated in the operation of the motor.

Motion converting unit-receiving section 33 is a motion converting unit chamber 33a with seating-support members 33b formed on it to close contact with the bottom of gear box 5 including a gear train, and the size of motion converting unit chamber 33a is the same as the whole width of integral housing box 30. Therefore, the whole width of integral housing box 30 depends on motion converting unit chamber 33a.

Operating force generating unit-receiving section 34 is defined parallel with and over the power generating unit-receiving section 31 and has a seating-support member 34a that supports screw rod 7 with a region on the bottom connected with motion converting unit-receiving section 33.

Seating-support member 34a is formed inn a predetermined length in a region on the bottom connected with motion converting unit-receiving section 33.

Front extended section 35 has a size of about a half the whole width of integral housing box 30, and where screw nut 10 threaded-fastened with screw rod 7 disposed in operating force generating unit-receiving section 34 is disposed.

Load sensor-receiving section 36 is a load sensor chamber 36a receiving load sensor 11 joined with extending shaft 8 of screw rod 7 positioned through gear box 5, and load sensor chamber 36a has seating-support members 36b vertically standing at both sides to closely contact with load sensor 11.

A plurality of fastening portions with holes for bolt- or screw-fastening protrude from around the outer surface of integral housing box 30, commonly except for front extended section 35, load sensor-receiving section 36, and rear extended section 38.

The vibration absorbing member in integral housing box 30, as shown in FIG. 1, includes a first isolator 20 of rubber that is provided tot partition 32 vertically standing to section power generating unit-receiving section 31 off, and absorbs vibration due to the motor by closely contacting with it.

Further, a plurality of isolators is mounted around the inside of motion converting unit-receiving section 33 where gear box 5 including the gear train rotated by the motor is mounted, that is, a second isolator 21 is disposed at the outside of gear box 5 opposite to the motor to absorb vibration due to rotation of driving gear 3 connected to the motor shaft, and third and fourth isolators 22, 23 are disposed at both side ends of gear box 5 to absorb vibration due to rotation of driven gear 4 that rotates screw rod 7.

Distributing member 50 has the same structure as common equalizers to equally distribute pulling force for the left and right cables 60, 70 connected to both sides.

Stationary brake B that restricts vehicle's movement by holding disc wheel D has the same configuration as a brake using parking cables that is pulled by a parking lever to restrict a vehicle.

The operation of an electric brake system with one cable for a vehicle according to an embodiment of the invention is now described below in detail with reference to the accompanying drawings.

According to the electric brake system with one cable for a vehicle according to an embodiment of the invention, the actuator that converts torque of the motor into axial force for operating parking cables 60, 70 is manufactured into a single module, housing box 30 that defines the whole external shape of the actuator is formed into an integral unit by injection molding. Further, the whole actuator is small-sized and vibration due to rotation in the operation of the actuator is absorbed, so that workability in mounting is improved and desired performance, such as reduction of operational noise caused by absorption of vibration, can be achieved.

The electric brake system with one cable for a vehicle having the above advantages has such a high flexibility in laying-out for mounting into a vehicle that it can be mounted at a variety of positions. For example, as shown in FIG. 1, when it is mounted at the trunk formed at the rear of a vehicle, the actuator is fastened by bolts, etc. on the bottom of the trunk of a vehicle, and then connecting cable 40 drawn out of the actuator is connected to distributing member 50 mounted along the bottom frame of the vehicle. According to the above configuration, mounting the electric brake system with one cable is completed through a very simple process.

Electric wiring is provided to the actuator to transmit the magnitude of axial load measured in the operation to ECU, and another electric wiring is provided to the operating switch to operate the actuator, which is a common way in constructing a circuit.

Left and right parking cables 60, 70 are drawn out of distributing member 50 and connected to brake B mounted to disc wheel D, respectively.

According to the electric brake system with one cable mounted as described above, as shown in FIG. 1, torque generated out of the motor in the actuator is boosted through a gear train of a pair of engaged gears and then converted into axial moving force to pull connecting cable 40 through screw rod 7 and screw nut 10, and left and right parking cables 60, 70 are equally pulled accordingly through distributing member 50 by pulling force generated from the axial moving force, finally brakes B are actuated.

When the operating switch is operated, torque of the motor, i.e. power generating unit 1, rotates driving gear 3, i.e. motion converting unit 2, through the motor shaft, and driven gear 4 engaged with driving gear rotates accordingly and rotates screw rod 7 of operating force generating unit 6 joined in its center.

As shown in FIGS. 2A and 2B, driven gear 4 and screw rod 7 are joined by firmly fitting restricting protrusions 4b protruding inside joining hole 4a of driven gear into fitting grooves 7a longitudinally formed on screw rod 7.

Vibration caused by rotation of the motor, driving gear 3, and driven gear 4 is absorbed into the vibration absorber. In other words, vibration due to the motor, power generating unit 1, is absorbed into first isolator 20 provided to partition 31 sectioning power generating unit-receiving section 31 off in integral housing box 30, that is, since first isolator 20 of rubber closely contacts to the motor, vibration due to rotation of the motor is absorbed.

Further, vibration due to rotation of driving gear 3 and driven gear 4 of motion converting unit 2 is absorbed into second, third, and fourth isolators 21, 22, 23 of rubber disposed around and closely contacting with the outer surface of gear box 5.

As screw rod 7 is rotated by driven gear 4, screw nut 10 threaded-fastened to an end of screw rod 7 axially moves to screw rod 7 due to the threaded-fastening, and connecting cable 40 fastened to screw nut 10 is pulled by the axial movement of screw nut 10 and the parking brake is actuated.

As connecting cable 40 is pulled by screw nut 10 in front extended section 35 protruding from a side of integral housing box 30, left and right parking cables 60, 70 connected with both sides of distributing member 50 connected with connecting cable 40 is equally pulled. Accordingly, as left and right parking cables 60, 70 are pulled, brakes hold disc wheels D and lock the wheels, and the operation of the parking brake system is completed.

During the operation of the parking brake system, axial load of the actuator is continuously transmitted to ECU. In detail, as shown in FIG. 1, load sensor 11 disposed in load sensor-receiving section 36 protruding from a side of integral housing box 30 and fastened to extending shaft 8 of screw rod 7 measures load, for example, in the same way as in Hall IC that senses changes in electric current through a deformed spring or in magnitude of magnetic force with respect to the rotation of screw rod 7, and then transmits it to ECU.

Supporting shaft 9 forming the opposite end to the end with screw nut 10 fastened of screw rod 7 is supported by supporting member 13 provided in rear extended section 38 extending from load sensor-receiving section 36 protruding from the side of integral housing box 30.

Made of steel, fixing plate 12 inserted in insertion slot 37 dividing load sensor-receiving section 36 protruding from the side of integral housing box 30 from rear extended section 38 is provided to prevent concentration of the load of integral housing box 30 and concentration of load due to the components arranged. For example, if load concentrates on the motor in integral housing box 30, the general load of integral housing box 30 is uniformly distributed by increasing the thickness of fixing plate 12.

When it is intended to release locking of the wheels by actuating the parking brake system, on the contrary to the locking, as the operating switch is operated, the rotational direction of the motor, driving gear 3, and driven gear 4 is reversed and screw rod 7 reversely rotate accordingly.

The reverse rotation of screw rod 7 results in axially pushing screw nut 10 threaded-fastened to screw rod 7. Accordingly, as connecting cable 40 fastened to screw nut 10 is loosened and left and right parking cables 60, 70 connected to both sides of distributing member 50 are also loosened, brakes B are released from disc wheel by left and right parking cable 60, 70 and the locking of the parking brake is released.

According to the embodiment of the invention, in an electric parking brake system, an actuator for axial load generation, motional direction conversion, and parking cable operation is formed into a single module and a housing box is formed into an integral unit that defines the whole external shape of the module, by injection molding, so that a small-sized actuator can be obtained and productivity can be improved by forming the housing box defining the whole external shape of the module into an integral unit through injection molding.

Further, in the actuator, power generating unit, of the electric parking brake system according to the embodiment of the invention, the load of the components in the integral housing is uniformly maintained and elastic members are attached around the components generating torque, so that vibration caused in the operation can be effectively distributed and absorbed.

Further, in the actuator, power generating unit, of the electric parking brake system according to the embodiment of the invention, when rotational power is converted into force for axial linear motion to pull the parking cable, it is designed such that force generated from the axial linear motion is not transmitted to the motor rotating, so that the durability of the housing box can be increased without particular structural design.

Further, according to the electric parking brake system of the embodiment of the invention, only one cable is connected to the actuator, and receives axial force out of the actuator and operates parking cables, so that high flexibility in laying-out for mounting into a vehicle can be obtained as compared with parking brake systems using two cables.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electric parking brake system with one cable for a vehicle, the parking brake system comprising:

an actuator including an integral housing that is formed by injection molding and has a plurality of sections inside, a power generator including a motor mounted in the housing and rotatable normally and reversely through power supplied depending on operational positions of an operating button, a motion converter including a gear train of a pair of engaged gears rotatable by the motor, an operating force generator including a screw nut fastened to a screw rod rotatable by the gear train and generating axial moving force to operate parking cables, a load sensor that measures axial load generated by the screw rod and transmits the measured load to an electronic control unit, and a vibration absorber mounted in the integral housing to absorb vibration generated by the motor and the gear train rotating, the actuator providing locking and releasing forces to parking brakes, the screw rod being fitted in a joining hole formed through the center of a driven gear of the gear train that is engaged with a driving gear rotated by the motor, and rotated by torque from the driven gear, the screw rod having fitting grooves longitudinally formed to insert restricting protrusions protruding inside the joining hole formed through the center of the driven gear, an extending shaft having a diameter smaller than that of the screw rod is coaxially formed at an end of the screw rod so that the load sensor is provided in the screw rod, and a supporting shaft, having a diameter smaller than that of the extending shaft of the screw rod, coaxially formed at the extending shaft and supported by a supporting member in the integral housing;

a fixing plate inserted in an insertion slot of the housing, the fixing plate supporting the supporting member;

a connecting cable fastened to the actuator and pullable by axial linear moving force generated by the actuator;

left and right parking cables extending from opposite sides of a distributing member to equally distribute the pulling force of the connecting cable into two directions, and connected to respective wheels; and stationary brakes holding the respective wheels by the pulling force of the left and right parking cables to restrict movement of a vehicle.

2. The parking brake system as defined in claim 1, wherein the driving gear of the gear train is fixed to a motor shaft, the motion converter rotating and generating axial moving force, and a gear box that receives the gear train and is mounted in the integral housing.

3. The parking brake system as defined in claim 2, wherein the driving gear and the driven gear are helical gears or spur gears.

4. The parking bake system defined in claim 1, wherein serrations are formed around the outer surface of the screw rod and engaged with serrations formed on the inside of the joining hole of the driven gear.

5. The parking brake system as defined in claim 1, wherein the integral housing is divided into a main space region that receives the motor, the gear train rotated by the motor, and the screw rod generating axial moving force, and a side extending space region that protrudes from opposite sides of the main space region in a width smaller than the whole width of the main space region and receives a part of the screw rod generating axial moving force and the load sensor measuring axial force of screw rod.

6. The parking brake system as defined in claim 5, wherein the main space region is divided into, a power generator receiving section including a connector chamber where the connector for a signal line and a power line for operation is disposed, a power generator chamber that is adjacent to connector chamber and has power generator seating-support members of ribs being in close contact with the motor to fix the motor, and a partition that vertically stands to divide the connector chamber from the power generator chamber integrally connected with connector chamber;

an operating force generator receiving section that is defined parallel with and over the power generator receiving section and receives the screw rod generating axial force to operate the parking cables at a operating force seating-support member; and a motion converter receiving section that is vertically defined at sides of the power generator receiving section and the operating force generator receiving section, and receives the gear box with the gear train generating axial moving force for the screw rod from driving force of the motor, the gear box being provided on a motion converter seating-support member.

7. The parking brake system as defined in claim 6, wherein the operating force seating-support member is formed in a predetermined length in a region on the bottom connected with the motion converting unit-receiving section.

8. The parking brake system as defined in claim 6, wherein
a first isolator, which is provided to the partition vertically standing to section the power generator receiving section off and comes into close contact with the motor, absorbs vibration of the motor,
- a second isolator, which is provide to the lower side opposite to the motor of the gear box in the motion converter receiving section and comes into close contact with the gear box, absorbs vibration caused by rotation of the motor and the driving gear, and
- third and fourth isolators, which are provided to both upper sides of the gear box in the motion converter receiving section and come into close contact with the gear box, absorb vibration caused by rotation of the driven gear and the screw rod.

9. The parking brake system as defined in claim 8, wherein the first to fourth isolators are formed of rubber.

10. The parking brake system defined in claim 5, wherein the side extending space region includes,
- a front extended section that protrudes from a side of the main space region in a smaller width than the main space region to receive the screw nut of which one end is threaded-fastened to the screw rod and the other end is connected to the connecting cable under axial moving force pulling the parking cables, and
- a load sensor-receiving section that protrudes in the same width as the front extended section, the load sensor-receiving section being provided on an opposite side of the main space region to the front extended section and receiving the load sensor measuring axial force of the screw rod.

11. The parking brake system as defined in claim 10, wherein the load sensor chamber includes load sensor seating-support members vertically standing at both sides thereof to be in close contact with the load sensor.

12. The parking brake system as defined in claim 10, wherein the load sensor-receiving section further includes a rear extended section that is defined by the insertion slot and receives the supporting member that supports the supporting shaft of the screw rod.

13. The parking brake system as defined in claim 12, wherein the fixing plate distributes the whole load of the integral housing.

14. The parking brake system as defined in claim 13, wherein the fixing plate is formed of steel.

15. The parking brake system as defined in claim 1, wherein the housing comprises an operating force generator receiving section and a power generator receiving section molded as an integral unit.

\* \* \* \* \*